United States Patent [19]

Hoshino et al.

[11] Patent Number: 4,949,292

[45] Date of Patent: Aug. 14, 1990

[54] VECTOR PROCESSOR FOR PROCESSING RECURRENT EQUATIONS AT A HIGH SPEED

[75] Inventors: Akihiko Hoshino, Tokyo; Shoji Nakatani; Koji Kuroda, both of Kawasaki; Tetsu Kawai, Yokohama, all of Japan

[73] Assignee: Fujitsu Limited, Kawasaki, Japan

[21] Appl. No.: 298,748

[22] PCT Filed: May 14, 1988

[86] PCT No.: PCT/JP88/00464

§ 371 Date: Jan. 11, 1989

§ 102(e) Date: Jan. 11, 1989

[87] PCT Pub. No.: WO88/09016

PCT Pub. Date: Nov. 17, 1988

[51] Int. Cl.$^5$ ............................. G06F 15/06; G06F 15/32
[52] U.S. Cl. ........................................ 364/736; 364/200
[58] Field of Search ................ 364/736, 730, 200, 900

[56] References Cited

U.S. PATENT DOCUMENTS 4,757,444 7/1988 Aoyama et al. ................... 364/200

FOREIGN PATENT DOCUMENTS 0167061 1/1986 European Pat. Off. .
0169030 1/1986 European Pat. Off. .

OTHER PUBLICATIONS

Kogge, "*The Architecture of Pipelined Computers*", chapter 5, pp. 181-187, 1981.

*Primary Examiner*—Gary V. Harkcom
*Assistant Examiner*—Tan V. Mai
*Attorney, Agent, or Firm*—Staas & Halsey

[57] ABSTRACT

An improved vector processor for processing a modified recurrent equation: $a_i = a_{i-2} \times b_{i-1} \times b_i + b_i \times c_{i-1} + c_i$, where i is an integer: $i = 1, 2, 3, \ldots, n$, at a high speed. The vector processor includes a data distribution circuit (40a, 40b), at least one odd term calculation circuit (10A, 10AA), and at least one even term calculation circuit (10B, 10BB). The odd term calculation circuit calculates odd terms of the modified recurrent equation: $a_j = (a_{j-2} \times b_{j-1} \times b_j) + (b_j + c_{j-1}) + c_j$, where j is an odd integer. The even term calculation circuit calculates even terms of the recurrent equations: $a_k = (a_{k-2} \times b_{k-1} \times b_k) + (b_k \times c_{k-1}) + c_k$, where k is an even integer. The data distribution circuit receives an initial, data $a_0$ and input vector (operand) data ($b_i$) and ($c_i$), and distributes that data to the odd and even term calculation circuits in a predetermined manner so that the above odd and even terms are calculated.

17 Claims, 8 Drawing Sheets

Fig. 6

VECTOR PROCESSOR FOR PROCESSING RECURRENT EQUATIONS AT A HIGH SPEED

BACKGROUND OF THE INVENTION

1. Field of the Invention

The present invention relates to a data processing system, more particularly, to a vector processor for processing recurrent equations at a high speed.

2. Description of the Related Art

Recent remarkable advances in computer technologies have improved the operation speed of supercomputers by providing, for example, vector processors. These vector processors are used to carry out scientific calculations, such as a numerical solution of linear equations or a numerical solution of differential equations, etc., at a very high speed.

In scientific technical calculations, the following recurrent operational algorithm (or recurrent equation) is frequently used to solve first order linear equations by a numerical solution, or differential equations by a difference method, etc.

$$a_i = a_{i-1} \times b_i + c_i \qquad (1)$$

where, $i = 1, 2, 3, \ldots, n$

This operational algorithm (1) shows the recurrent relationship between a datum $a_i$ and a datum $a_{i-1}$. In general, the operation of the above recurrent equation is not suitable for calculations by the vector processor at a high speed, since the datum $a_{i-1}$ is used again to calculate the datum $a_i$, i.e., the term $a_i$ must be calculated after calculation of the term $a_{i-1}$. Therefore, prior art vector processors cannot calculate the recurrent equations at a high speed. The prior art vector processor used for handling recurrent equation will be described later with reference to the drawings.

Nevertheless, there is a strong demand for a capability to calculate the recurrent equation at a high speed by using a vector processor, since many recurrent equations are used in the scientific technical calculation field.

SUMMARY OF THE INVENTION

An object of the present invention is to provide a vector processor which can process recurrent equations at a high speed.

Another object of the present invention is to provide a vector processor having a simple circuit construction which can be easily formed.

According to the present invention, there is provided a vector processor including a vector instruction control unit for controlling vector instructions, a vector storage access unit for accessing input vector data and calculated data to a main storage unit, a vector calculation unit for calculating vector data under the control of the vector instruction unit, and a data distribution unit for transferring data between the vector data access unit and the vector calculation unit, characterized in that the vector processor comprises a vector calculation unit including at least one odd term calculation circuit and at least one even term calculation circuit, and a data distribution unit operatively connected to and cooperative with said vector calculation unit, to process a modified recurrent equation. Each odd term calculation circuit is formed to calculate odd terms of the modified recurrent equation and includes an adding circuit, a multiplication circuit, at least one data storage circuit holding a calculated odd term, and at least one feedback line for feeding back the calculated odd term to the multiplication circuit and/or the adding circuit through the data storage circuit. Each even term calculation circuit is formed to calculated even terms of the recurrent equation and includes another adding circuit, another multiplication circuit, at least one other data storage circuit holding a calculated even term, and at least one other feedback line for feeding back the calculated even term to another multiplication circuit and/or another adding circuit through another data storage circuit. The data distribution unit includes a first data setter for outputting zero, a second data setter for outputting one, first to sixth selectors for selecting input operands used for calculating the recurrent equation, constant data 0 and 1 from the setters, and the calculated odd and even terms, and a selector control circuit for controlling the selectors in a predetermined manner defined by the modified recurrent equation, to supply selected data to the odd and even term calculation circuits.

The recurrent equation expressed by the formula (1) can be modified as shown in the following formula, when a first-order development is applied:

$$\begin{aligned} a_i &= a_{i-1} \times b_i + c_i \\ &= \{(a_{i-2} \times b_{i-1}) + c_{i-1}\} \times b_i + c_i \\ &= a_{i-2} \times b_{i-1} \times b_i + b_i \times c_{i-1} + c_i \end{aligned} \qquad (2)$$

When an index i is even, for example, an even index $k = 2, 4$, and 6.

$$\begin{aligned} a_2 &= a_0 \times b_1 \times b_2 + b_2 \times c_1 + c_2 \\ a_4 &= a_2 \times b_3 \times b_4 + b_4 \times c_3 + c_4 \\ a_6 &= a_4 \times b_5 \times b_6 + b_6 \times c_5 + c_6 \end{aligned} \qquad (3)$$

When an index i is odd, for example, an odd index $j = 1, 3, 5$, and 7.

$$\begin{aligned} a_1 &= a_0 \times b_1 \times 1 + 1 \times c_1 + 0 \\ a_3 &= a_1 \times b_2 \times b_3 + b_3 \times c_2 + c_3 \\ a_5 &= a_3 \times b_4 \times b_5 + b_5 \times c_4 + c_5 \\ a_7 &= a_5 \times b_6 \times b_7 + b_7 \times c_6 + c_7 \end{aligned} \qquad (4)$$

Note that there is no direct recurrent relationship between the terms $a_2$ and $a_0$, $a_4$ and $a_2$, and $a_6$ and $a_4$. Similarly, there is no direct recurrent relationship between the terms $a_3$ and $a_1$, $a_5$ and $a_3$, and $a_7$ and $a_5$. Accordingly, the odd term calculation circuit can calculate odd terms $a_j$ without a delay by the direct recurrence, and the even term calculation circuit can calculate even terms $a_k$ without a delay by the direct recurrence, and thus contribute to a high speed calculation of the recurrent equations.

BRIEF DESCRIPTION OF THE DRAWINGS

FIG. 6 is an operation timing chart of the vector processor shown in FIG. 5;

DESCRIPTION OF THE PREFERRED EMBODIMENTS

Before describing preferred embodiments of a vector processor in accordance with the present invention, a high speed data processing system in which the vector processor is provided will be described with reference to FIG. 1.

Figure 1:
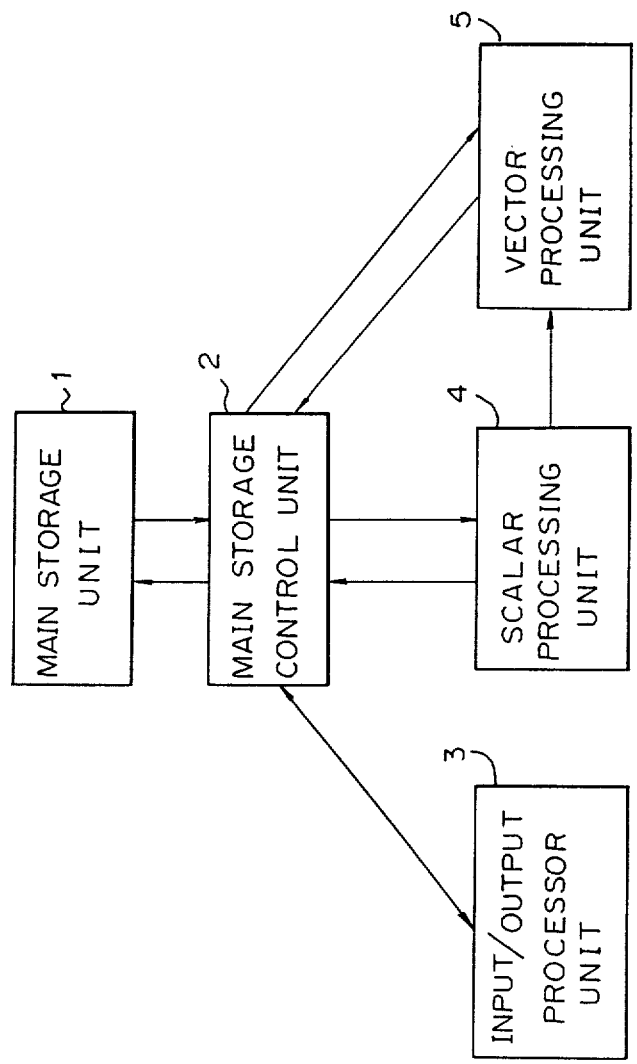
FIG. 1 is a block diagram of a high speed data processing system which includes a vector processor of the present invention.

In FIG. 1, the high speed data processing system consists of a main storage unit (MSU) 1, a main storage control unit (MSCU) 1, an input/output (I/O) processing unit 3, a scalar data processing unit (scalar processor) 4, and a vector data processing unit (vector processor) 5. The I/O processing unit 3 inputs data to be calculated and outputs data calculated at the scalar processor 4 and/or the vector processor 5. The MSU 1 stores the input data and the calculated data. The scalar processor 4 controls all calculations. When operation commands concern a scalar operation, the scalar processor 4 executes a scalar data calculation. When operation commands concern a vector operation, the scalar processor 4 transfers control to the vector processor 5 to carry out a vector calculation at the vector processor 5. Namely, the vector processor 5 is triggered by the scalar processor 4 when the vector calculation is requested, and carries out the vector calculation. The MSCU 2 controls the data flow among the MSU 1, the I/O processing unit 3, the scalar processor 4, and the vector processor 5.

Figure 2:
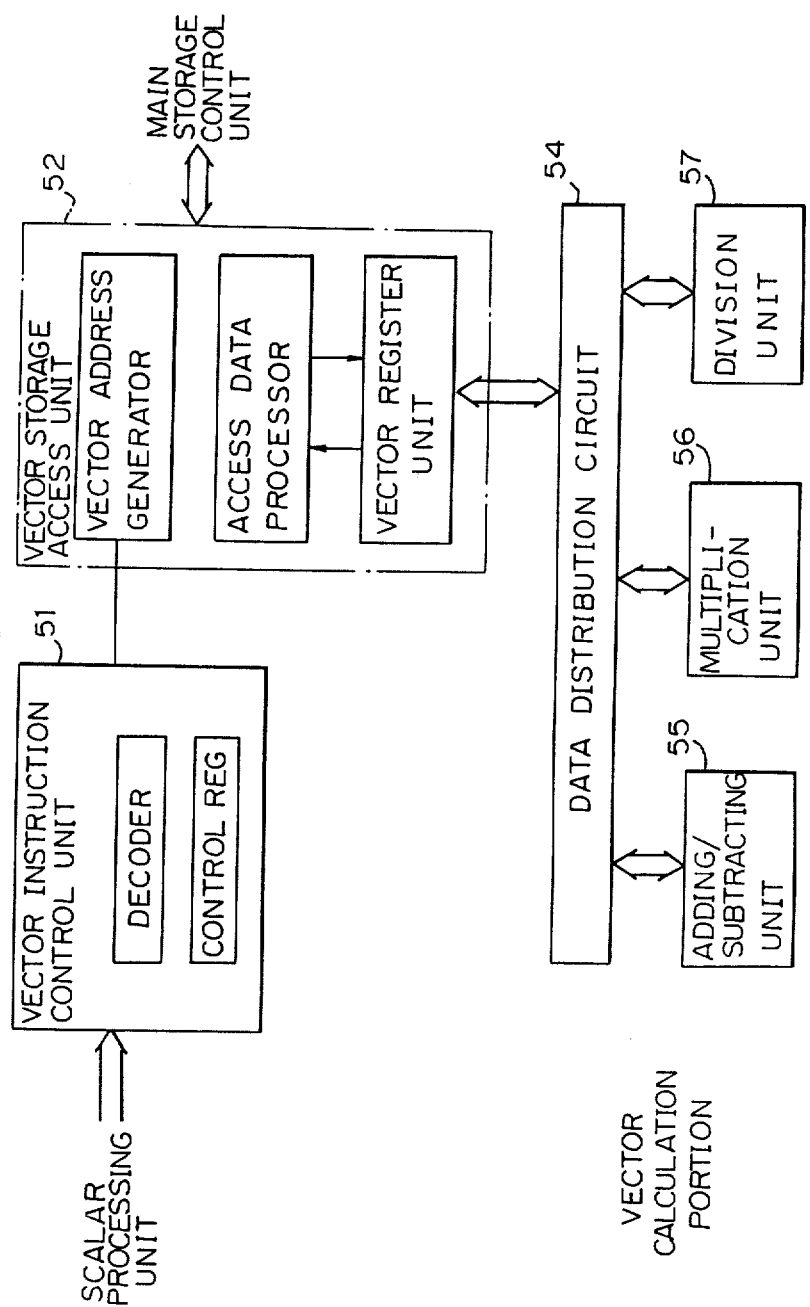
FIG. 2 is a block diagram of a general vector processor used in the data processing system shown in FIG. 1.

A general configuration of the vector processor 5 shown in FIG. 1 is shown in FIG. 2. In FIG. 2, the vector processor 5 includes a vector instruction control unit (VICU) 51 having a decoder and a control register; a vector storage access unit (VSAU) 52 having a vector address generator, an access data processor and a vector register unit; a data distribution unit 54; and a vector calculation portion having an adding and subtracting unit 55, a multiplication unit 56, and a division unit 57. The VICU 51 receives data control instructions from the scalar processor 4. The control register saves control data of the data control instructions. The decoder decodes the data control instructions. The VSAU 52 transfers data between the MSU 1 and the vector calculation portion through the MSCU 2 and the data distribution unit 54. The vector address generator generates addresses for accessing data in the MSU 1 in accordance with the decoded instructions. The access data processor controls data between the MSU 1 and the vector register unit. Data to be used for a vector calculation are once stored in the vector register unit. Also, data calculated at the vector calculation portion are stored in the vector register unit. The data distribution unit 40 distributes the data from the vector register unit to supply the same to the adding-subtracting unit 55, the multiplication unit 56, and the division unit 57 in accordance with the decoded instruction. The units 55, 56, and 57 are operatively connected to perform the vector calculation. The vector calculated data are stored in the vector register unit through the data distribution unit 40, thereafter, are stored in the MSU 1.

Figure 3:
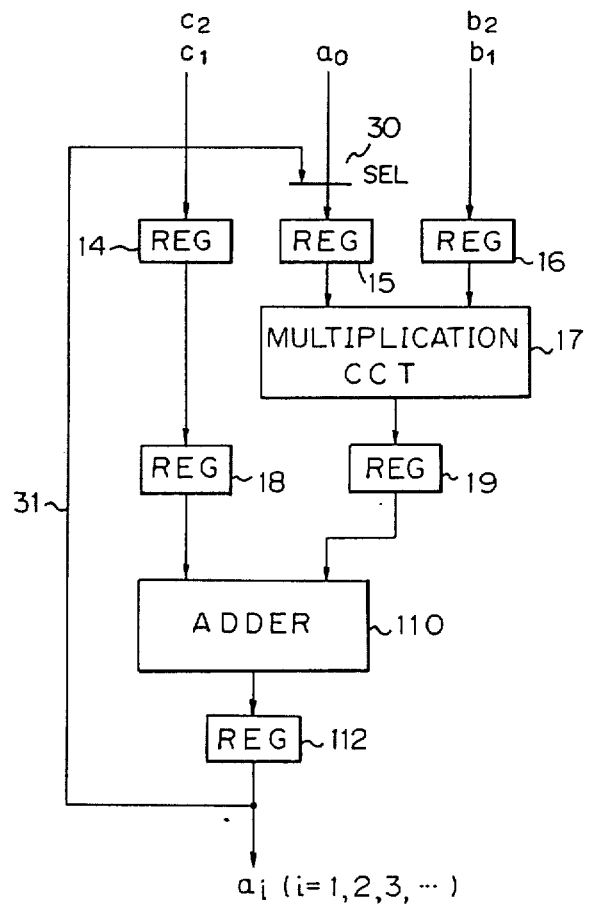
FIG. 3 is a circuit diagram of a prior art vector processor.
Figure 4:
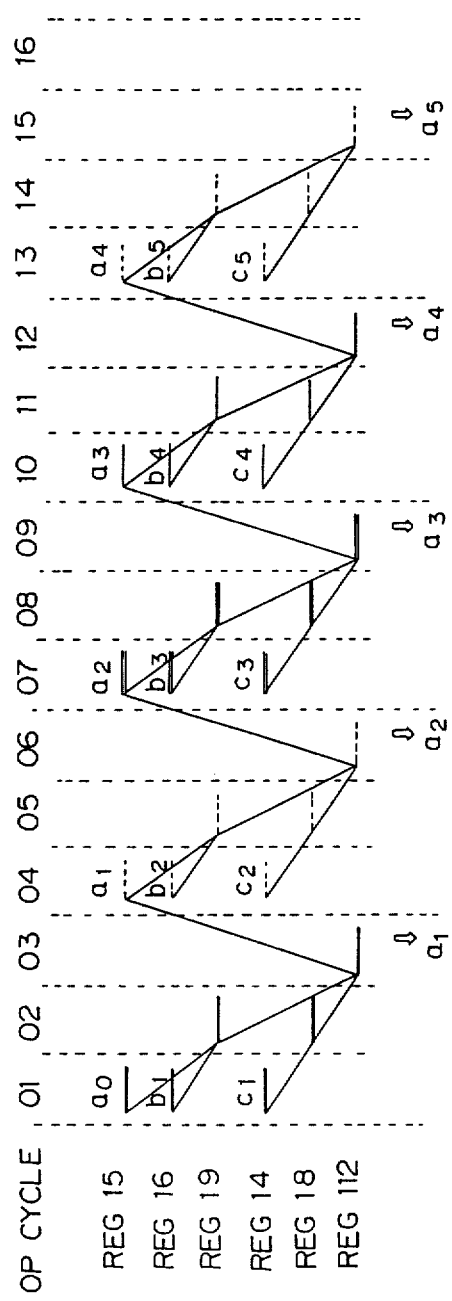
FIG. 4 is an operation timing chart of the vector processor shown in FIG. 3.

A prior art of a vector processor will be described with reference to FIGS. 3 and 4. FIG. 3 shows an elementary circuit diagram for processing the recurrent equation discussed above. FIG. 4 shows an operation timing chart of the vector processor of FIG. 3.

In FIG. 3, the vector processor includes a selector 30, registers 14, 15 and 16, a multiplication circuit 17, registers 18 and 19, an adder 110, a register 112, and a feedback line 31 connected between an output terminal of the register 112 and an input terminal of the selector 30. These circuit components are a part of the vector calculation portion shown in FIG. 3. The multiplication circuit 17 calculating a term: $a_{i-1} \times b_i$. The adder 110 adds $c_i$ and the result from the multiplication circuit 17. On one hand, the added data is fed back to the multiplication circuit 17 through the feedback line 31, the selector 30 and the register 15 to use a next term calculation, and on other hand, the added data is output to the vector register unit. The selector 30 outputs an initial vector data $a_0$ at an initial time. The registers 14, 15, and 16, the registers 18 and 19, and the register 112 are provided to hold the data, respectively. The register 112 and the feedback line 31 are provided to feed back the calculated data $a_i$ to the register 15 for calculating a next term $a_{i+1}$.

Note that, since subtraction and division are not needed to calculate the recurrent equation, a subtracting circuit and a division circuit are omitted in FIG. 3.

The operation of the vector processor shown in FIG. 3 will be described in more detail with reference to FIG. 4.

When an integer i indicating an index of the recurrent equation is 1, the recurrent equation is expressed as follows:

$$a_1 = a_0 \times b_1 + c_1$$

Thus, at the operation cycle 01, initial data $c_1$, $a_0$, and $b_1$ are loaded into the registers 14, 15, and 16 from the vector register unit shown in FIG. 2. Then, a multiplication of $(a_0 \times b_1)$ is carried out at the multiplication circuit 17. At the operation cycle 02, the data $c_1$ loaded in the register 14 is transferred to the register 18. Also, the data calculated at the multiplication circuit 17 is transferred to the register 19. Thereafter, the adder 110 adds the data $c_1$ and the data stored in the register 19, to obtain the result $a_1$. At the operation cycle 03, the result $a_1$ is stored in the register 112, and is then output to the vector register unit shown in FIG. 2 through the data distribution unit 54.

At the operation cycle 04, the next vector data $b_2$ and $c_2$ are loaded into the registers 16 and 14 through the vector register unit. At the same time, the data $a_1$ stored in the register 112 is loaded into the register 15 through the feedback line 31 and the selector 30. During the operation cycles 04–06, a calculation of a next term: $a_2 = a_1 \times b_2 + c_2$ is carried out.

Similarly, during the operation cycles 07=09, a calculation of a term: $a_3 = a_2 \times b_3 + c_3$ is carried out. During the operation cycles 10–12, a calculation of a term: $a_4 = a_3 \times b_4 + c_4$ is carried out. During the operation cycles 13–15, a calculation of a term: $a_5 = a_4 \times b_5 + c_5$ is carried out.

As described above, a calculation time for obtaining one term $a_i$ requires three operation cycles. If 100 terms of vector processing are required, 300 operation cycles are needed to obtain calculated data of 100 recurrent equations. Accordingly, a high speed operation for calculating the recurrent equations, in particular, for high order recurrent equations, can not be achieved by the prior art vector processor.

The above defect depends upon a recurrence relationship wherein a calculation of a term $a_i$ must be carried out after a calculation of a just previous term $a_{i-1}$. Thus, the prior art vector processor is made idle in order to calculate the just previous term before proceeding to a calculation of a next term. Therefore, even though the vector processor correctly solves the above recurrent equation, the vector processor still suffers from the above described low speed operation.

The present invention solves the above defect by modifying the recurrent equation.

The recurrent equation described above can be modified as follows:

$$\begin{aligned} a_i &= a_{i-1} \times b_i + c_i \\ &= (a_{i-2} \times b_{i-1} + c_{i-1}) \times b_i + c_i \\ &= (a_{i-2} \times b_{i-1} \times b_i) + b_i \times c_{i-1} + c_i \end{aligned} \quad (2)$$

where, i is an integer indicating an index, i=1, 2, 3, . . . , n $a_i$ are calculated vector data, $b_i$ are input vector data, and $c_i$ are input vector data.

From the formula (2), it is recognized that there is no direct recurrent relationship between a term $a_i$ and another term $a_{i-2}$ like the direct recurrent relationship between a term $a_i$ and another term $a_{i-1}$ discussed above. According to the above formula (2), a calculation of the term $a_i$ is not affected by a calculation of a just previous term $a_{i-1}$. The term $a_{i-2}$ is already calculated two steps prior to a calculation of the term $a_i$, and thus a calculation of the term $a_i$ can be carried out immediately without a delay in the calculation of the just previous term $a_{i-1}$. But, the above concept cannot be realized unless odd terms and even terms are separately operated.

When an index i is even, an even index k is used, and the above formula (2) is expressed as follows:

$$\begin{aligned} k &= 2: a_2 = a_0 \times b_1 \times b_2 + b_2 \times c_1 + c_2 \\ k &= 4: a_4 = a_2 \times b_3 \times b_4 + b_4 \times c_3 + c_4 \\ k &= 6: a_6 = a_4 \times b_5 \times b_6 + b_6 \times c_5 + c_6 \\ &\vdots \qquad \vdots \end{aligned} \quad (3)$$

When an index i is odd, an odd index j is used, and the above formula (1) is expressed as follows:

$$\begin{aligned} j &= 1: a_1 = a_0 \times b_1 \times 1 + 1 \times c_1 + 0 \\ j &= 3: a_3 = a_1 \times b_2 \times b_3 + b_3 \times c_2 + c_3 \\ j &= 5: a_5 = a_3 \times b_4 \times b_5 + b_5 \times c_4 + c_5 \\ &\vdots \qquad \vdots \end{aligned} \quad (4)$$

Note that, since there is no direct recurrent relationship between, for example, the terms $a_0$ and $a_2$, the terms $a_2$ and $a_4$, the terms $a_4$ and $a_6$, the terms $a_1$ and $a_3$, or the terms $a_3$ and $a_5$, except for the terms $a_0$ and $a_1$, a pair of terms, for example, $a_3$ and $a_4$, can be calculated in parallel. This enables a high speed vector data calculation. Nevertheless, a calculation of the terms $a_3$ and $a_4$ must be carried out after the calculation of the terms $a_1$ and $a_2$.

A first embodiment of a vector processor in accordance with the present invention will be specifically described with reference to FIG. 5.

Figure 5:
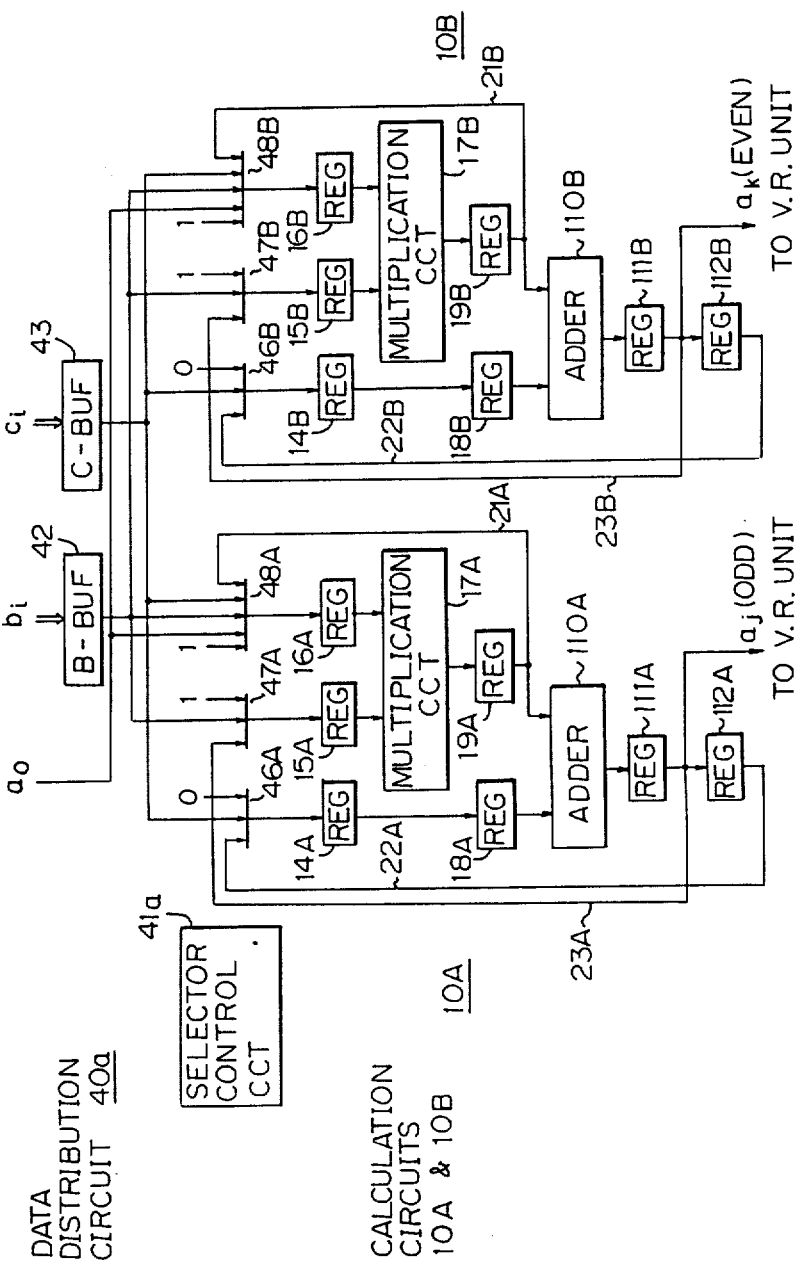
FIG. 5 is a circuit diagram of an embodiment of a vector processor in accordance with the present invention.

In FIG. 5, the vector processor includes a data distribution circuit 40a, and a vector data calculation unit consisting of an odd term calculation circuit 10A and an even term calculation circuit 10B.

The data distribution circuit 40a is provided in the vector register unit shown in FIG. 2, the odd term calculation circuit 10A, and the even term calculation circuit 10B, to supply an initial operand (data) $a_0$, and operands (input vector data) $b_i$ and $c_i$ to the odd and even term calculation circuits 10A and 10B, in a predetermined manner discussed later. The data distribution circuit 40a also receives odd term data $a_j$ calculated at the odd term calculation circuit 10A and even term data $a_k$ calculated at the even term calculation circuit 10B, and outputs the same to the vector register unit.

The data distribution circuit 40a includes a selector control circuit 41a, a B-buffer (B-BUFF) 42 of a first-in first-out type (FIFO) buffer, for first inputting the operands $b_i$ and first outputting the same, and a C-buffer (C-BUFF) 43, which is also a FIFO buffer, for first inputting the operands $c_i$ and first outputting the same. The data distribution circuit 40a also includes selectors 46A, 47A, 48A, 46B, 47B, and 48B. The data distribution circuit 40a further includes a zero (0) setter (not shown) for outputting zero to the selectors 46A and 46B, and a one (1) setter (not shown) for outputting one to the setters 47A, 48A, 47B, and 48B.

The odd term calculation circuit 10A for calculating the odd terms $a_j$ includes first stage registers 14A, 15A and 16A, a multiplication circuit 17A, second stage registers 18A and 19A, an adder 110A, a third stage registers 111A, a fourth stage register 112A, a first feedback line 21A connected between an output terminal of the register 19A and an input terminal of the selector 48A, and a second feedback line 22A connected between an output terminal of the register 112A and an input terminal of the selector 46A, and a third feedback line 23A connected between an output terminal of the register 111A and an input terminal of the selector 47A. Calculated odd terms $a_j$ are sequentially output from the register 111A to the vector register unit.

The registers 111A and/or 112A can be included in the data distribution circuit 40a.

The even term calculation circuit 10B for calculating the even terms $a_k$ has the same circuit construction as that of the odd term calculation circuit 10A, because the operational algorithms are the same in both cases. Since both the odd and even term calculation circuits 10A and 10B can have the identical construction, the design, production and mounting thereof on a printed circuit board (PCB) are greatly simplified. Both of the odd and even term calculation circuits 10A and 10B are operable independently and simultaneously.

The operation of the vector processor shown in FIG. 5 will be described.

Supposing that the operands $a_i$, $c_i$ and the initial operand $a_0$ are previously stored in the MSU 2 shown in FIG. 1, and the following instruction set is detected at the scalar processor 4, the scalar processor 4 transfers control of the operation to the vector processor shown in FIG. 5, triggering the vector processor.

TABLE 1

| | |
|---|---|
| VL | A(O) TO VR00 |
| VL | B(I) TO VR01 |
| VL | C(i) TO VR02 |
| VCAL | A(i) = A(i - 1) × B(I) +C(i) |

TABLE 1-continued

| VST | A(i) TO VR00 |
|---|---| where, VL indicates a "Vector Load" instruction, VCAL indicates a "Vector Calculation" instruction, VST indicates a "Vector Store" instruction A(i), B(i), and C(i) correspond to $a_i$, $b_i$ and $c_i$, and VR00, VR01 and VR02 indicate vector registers 00, 01 and 02 in the vector register unit shown in Fig. 2. Note, in this embodiment, each vector register has a memory capacity of 100 words.

First, the vector storage access unit (VSAU) 52 shown in FIG. 2 loads vector data $a_0$, $b_1 - b_{100}$, and $c_1 - c_{100}$ stored in the main storage unit (MSU) 1 into the vector registers VR00, VR01 and VR02 of the vector register unit through the main storage control unit (MSCU) 2, in response to the above "Vector Load" instruction, under the control of the vector instruction control unit (VICU) 51 shown in FIG. 2.

During the above vector data loading, a calculation of recurrent equation: $a_i = a_{i-1} \times b_i + c_i$ at the circuit shown in FIG. 5, and a store of calculated data $a_i$ into the vector register VR00 are carried out, in response to the above "Vector Calculation" and "Vector Store" instructions, under the control of the VICU 51.

The calculated data $a_i$ in the vector register VR00 can be stored in the MSU 1 during the above operation.

Figure 6:
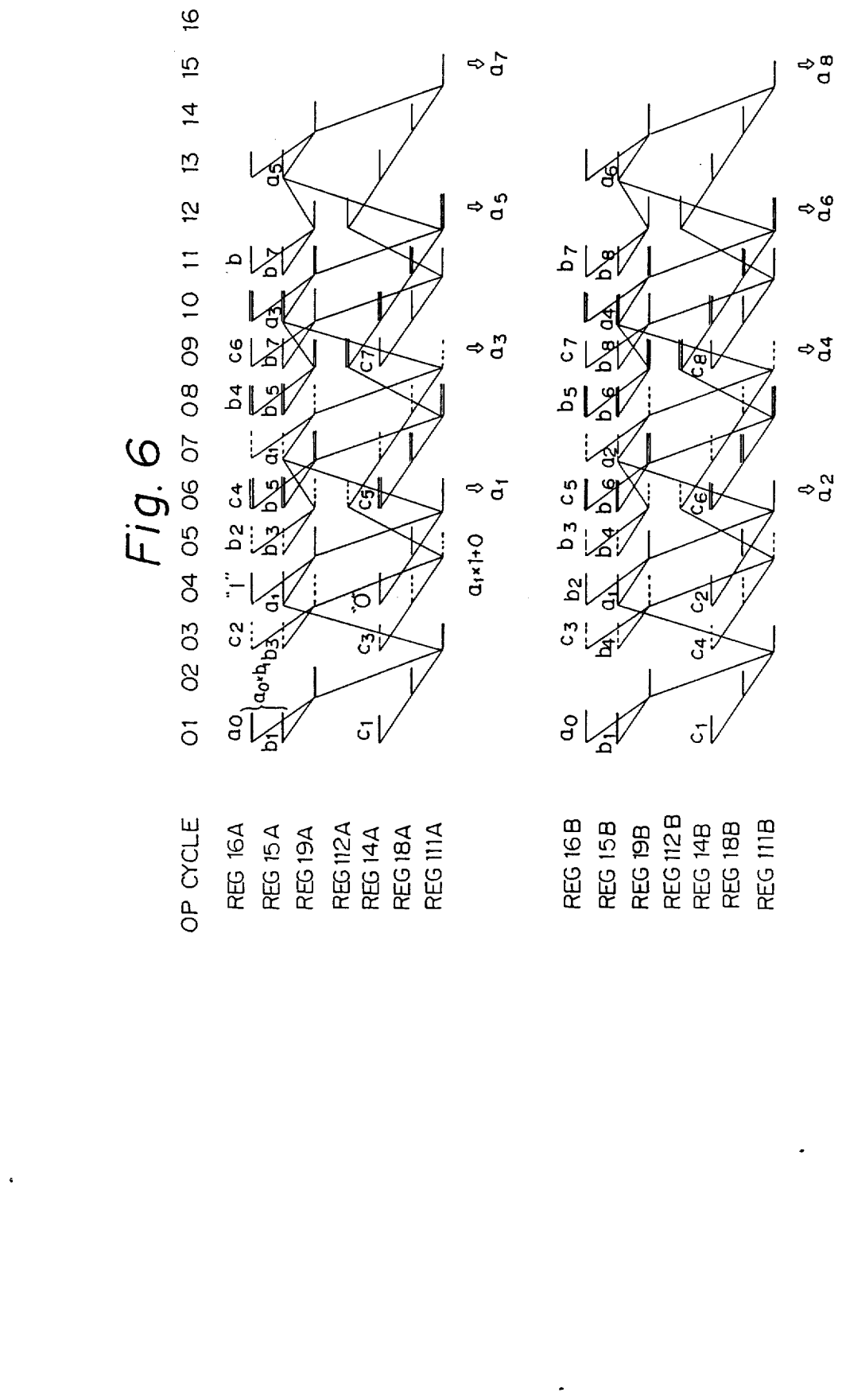

Now, a detailed operation of the circuit of FIG. 5 will be described with reference to FIG. 6.

A calculation consists of an initial term calculation for calculating the initial terms $a_1$ and $a_2$, and a normal term calculation for calculating subsequent terms, for example, $a_3$ and $a_4$, $a_5$ and $a_6$, etc.

First, the initial term calculation will be described.

Below TABLE 2 and TABLE 3 show data loaded into the registers 14A, 15A, 16A and 111A, and the registers 14B, 15B, and 16B, and 111B under the control of the selector control circuit 41a.

TABLE 2

| OP CYCLE | REG 14A | REG 15A | REG 16A | REG 111A |
|---|---|---|---|---|
| 01 | $c_1$ | $b_1$ | $a_0$ | |
| 02 | | | | |
| 03 | | | | |
| 04 | 0 | $a_0 \times b_1 + c_1$ | 1 | |
| 05 | | | | |
| 06 | | | | $a_1$ |

TABLE 3

| OP CYCLE | REG 14B | REG 15B | REG 16B | REG 111B |
|---|---|---|---|---|
| 01 | $c_1$ | $b_1$ | $a_0$ | |
| 02 | | | | |
| 03 | | | | |
| 04 | $c_2$ | $a_0 \times b_1 + c_1$ | $b_2$ | |
| 05 | | | | |
| 06 | | | | $a_2$ |

The data distribution circuit 40a loads initial operands $a_0$, $b_1$ and $c_1$ therein; the operands $b_1$ and $c_1$ being stored in the B-BUFF 42 and the C-BUFF 43, respectively.

OPERATION CYCLE 01

At the operation cycle 01, the selector control circuit 41a controls the selectors 46A, 47A, and 48A to output the operands $c_1$, $b_1$, and $a_0$ to the registers 14A, 15A, and 16A in the odd term calculation circuit 10A. These registers 14A, 15A, and 16A store the operands $c_1$, $b_1$, and $a_0$. At the same time, the selector control circuit 41a controls the selectors 46B, 47B, and 48B to output the operands $c_1$, $b_1$, and $a_0$ to the registers 14B, 15B, and 16B in the even term calculation circuit 10B. These registers 14B, 15B, and 16B also save the operands $a_0$, $b_1$, and $c_1$.

In the odd term calculation circuit 10A, the register 16A outputs the saved operand $a_0$ to the multiplication circuit 17A as a multiplicand, and the register 15A outputs the saved operand $b_1$ to the multiplication circuit 17A as a multiplier. Thus, the multiplication circuit 17A calculates $(a_0 \times b_1)$.

At the same time, in the even term calculation circuit 10B, the register 16B outputs the saved operand $a_0$ to the multiplication circuit 17B as a multiplicand, and the register 15B outputs the saved operand $b_1$ to the multiplication circuit 17B as a multiplier. The multiplication circuit 17B calculates $(a_0 \times b_1)$.

OPERATION CYCLE 02

In the odd term calculation circuit 10A, data $(a_0 \times b_1)$ calculated at the multiplication circuit 17A is transferred to the register 19A and saved therein. The data $c_1$ saved at the register 14A is also transferred to the register 18A and saved therein.

At the same time, in the even term calculation circuit 10B, data $(a_0 \times b_1)$ calculated at the multiplication circuit 17B is transferred to the register 19B and saved therein. The data $c_1$ saved at the register 14B is transferred to the register 18B.

Thereafter, in the odd term calculation circuit 10A, the adder 110A adds the data $(a_0 \times b_1)$ and the data $c_1$. As a result, the following first odd term is obtained.

$$a_1 = a_0 \times b_1 + c_1$$

Similarly, at the same time, in the even term calculation circuit 10B, the above first odd term $a_1$ is obtained by the adder 110B.

OPERATION CYCLE 03

In the odd term calculation circuit 10A, the calculated first odd term $a_1$ is transferred to the register 111A and saved therein.

Also, in the even term calculation circuit 10B, the calculated first odd term $a_1$ is transferred to the register 111B and saved therein.

During the above operation, the data distribution circuit 40a loads operands ($b_2$, $b_3$, $b_4$) and ($c_2$, $c_3$, $c_4$) into the B-BUFF 42 and the C-BUFF 43 from the vector registers VR01 and VR02, respectively.

Note that, although having obtained the first odd term $a_1$, the data distribution circuit 40a does not output the same to the vector register VR00 at this time, because a first even term $a_2$ has not been obtained.

OPERATION CYCLES 04–06

Until the first even term $a_2$ is obtained at the even term calculation circuit 10B, the odd term calculation circuit 10A and the data distribution circuit 40a cooperate to keep the data $a_1$ as is, and to prepare operands used for calculating a second odd term $a_3$.

As the operation cycle 04, the selector control circuit 41a controls the selectors 46A, 47A, and 48A to set zero data to the register 14A, the calculated first odd term $a_1$ to the register 15A through the register 111A and the feedback line 23A, and a data of one (1) to the register 16A. As a result, at the operation cycle 04, the multiplication circuit 17A calculates $(a_1 \times 1)$, and at the operation cycle 06, the adder 110A adds the data $(a_1 \times 1)$ from the register 19A and the data of zero (0) from the registers 18A. Namely, the following dummy calculation is effected.

$$a_1 = (a_1 \times 1) + 0$$

During the above operation, at the operation cycle 05, the selector control circuit 41a controls the selectors 47A and 48A to set an operand $b_3$ to the register 15A, and an operand $b_2$ to the register 16A. The data $a_1$ is transferred to the register 111A at the operation cycle 05, and is further stored in the register 112A at the operation cycle 06.

Conversely, in the even term calculation circuit 10B, the following first even term $a_2$ is calculated by using the first odd term $a_1$ calculated therein and saved in the registers 112B.

$$a_2 = (1 \times a_2) + c_2$$

For this purpose, at the operation cycle 04, the selector control circuit 41a controls the selectors 46B, 47B, and 48B to set the operand $c_2$ to the register 14B, the first odd term $a_1$ saved in the register 111B to the register 15B through the feedback line 23B, and the operand $b_2$ to the register 16B. At the operation cycle 05, the first even term $a_2$ is obtained at the adder 110B, and at the operation cycle 06, the first even term $a_2$ is stored in the registers 111B.

The data distribution circuit 40a transfers the pair of first odd and even terms $a_1$ and $a_2$ to the vector register VR00 from the register 111A and 111B.

The initial term calculation is thus completed.

The normal term calculation will now be described.

OPERATION CYCLES 03–09

First, a calculation of a second odd term $a_3$ in the odd term calculation circuit 10A will be described.

Since the second odd term $a_3$ is defined by the following formula, the selector control circuit 41a controls the selectors 46A, 47A, and 48A to load data as shown in TABLE 4 into the registers 14A, 15A, and 16A at the following operation cycles shown in TABLE 4.

$$a_3 = a_1 \times (b_2 \times b_3) + b_3 \times c_3 + c_3$$

TABLE 4

| OP CYCLE | REG 14A | REG 15A | REG 16A |
|---|---|---|---|
| 03 | $c_3$ | $b_3$ | $c_2$ |
| 04 | | | |
| 05 | — | $b_3$ | $b_2$ |
| 06 | | | |
| 07 | $b_3 \times c_2 + c_3$ | $a_1$ | $b_2 \times b_3$ |
| 08 | | | |
| 09 | | | |

At the operation cycle 03, a multiplication value $(b_3 \times c_2)$ is obtained at the multiplication circuit 17A. At the operation cycle 05, a sum $(b_3 \times c_2) + c_3$ is obtained at the adder 110A. At the operation cycle 05, a multiplication value $(b_2 \times b_3)$ is obtained at the multiplication circuit 17A. At the operation cycle 07, a multiplication value $(a_1 \times b_2 \times b_3)$ is obtained at the multiplication circuit 17A. At the operation cycle 08, the calculated data $(a_1 \times b_2 \times b_3)$ is supplied to the adder 110A. The above second odd term $a_3$ is obtained at the adder 111A. The calculated second odd term $a_3$ is saved at the register 111A at the operation cycle 08. At the operation cycle 09, the second odd term $a_3$ saved in the register 111A is transferred to the vector register VR00 and saved in the register 112A.

In the above, the data $a_1$ saved in the register 112A is fed back to the register 14A through the feedback line 22A. Also, the data $(b_2 \times b_3)$ saved in the register 19A is fed back to the register 16A through the feedback line 21A. The sum $(b_3 \times c_2) + c_3$ stored in the register 111A is fed back to the register 15A through the feedback line 23A.

Similarly, the following second even term $a_4$ is obtained at the even term calculation circuit 10B.

$$a_4 = a_2 \times b_3 \times b_4 + b_4 \times c_3 + c_4$$

The selector control circuit 41a also controls the selectors 46B, 47B, and 47B to load the following data shown in TABLE 5 into the registers 14B, 15B, and 16B.

TABLE 5

| OP CYCLE | REG 14B | REG 15B | REG 16B |
|---|---|---|---|
| 03 | $c_4$ | $b_4$ | $c_3$ |
| 04 | | | |
| 05 | | $b_4$ | $b_3$ |
| 06 | | | |
| 07 | $c_3 \times b_4 + c_4$ | $a_2$ | $b_3 \times b_4$ |
| 08 | | | |
| 09 | | | |

At the operation cycle 09, the odd and even terms $a_3$ and $a_4$ are transferred to the vector register VR00 in the vector register unit.

OPERATION CYCLES 06–12

Similarly, during the operation cycles 06–12, the following third odd and even terms $a_5$ and $a_6$ are obtained at the odd and even term calculation circuits 10A and 10B.

$$a_5 = a_3 \times b_4 \times b_5 + b_5 \times c_4 + c_5$$
$$a_6 = a_4 \times b_5 \times b_6 + b_6 \times c_5 + c_6$$

To achieve the above calculation, the selector control circuit 41a controls the selectors 46A, 47A, 48A, 46B, 47B and 48B to load the following data shown in TABLE 6 and TABLE 7 to the registers 14A, 15A, 16A, 14B, 15B and 16B.

TABLE 6

| OP CYCLE | REG 14A | REG 15A | REG 16A |
|---|---|---|---|
| 06 | $c_5$ | $b_5$ | $c_4$ |
| 07 | | | |
| 08 | — | $b_5$ | $b_4$ |
| 09 | | | |
| 10 | $c_4 \times b_5 + c_5$ | $a_3$ | $b_4 \times b_5$ |
| 11 | | | |
| 12 | | | |

TABLE 7

| OP CYCLE | REG 14B | REG 15B | REG 16B |
|---|---|---|---|
| 06 | $c_6$ | $b_6$ | $c_5$ |
| 07 | | | |
| 08 | — | $b_6$ | $b_5$ |
| 09 | | | |
| 10 | $c_5 \times b_6 + c_6$ | $a_4$ | $b_5 \times b_6$ |
| 11 | | | |
| 12 | | | |

At the operation cycle 11, the odd and even terms $a_5$ and $a_6$ are obtained at the adders 111A and 111B and are transferred to the vector register VR00.

Other pluralities of pairs of odd and even terms are obtained in the same way as described above.

A calculation of a pair of odd and even terms requires only three operation cycles, except for a calculation of the first odd and even terms. This time is same as that of the prior art vector processor. According to the vector processor shown in FIG. 5, twice the amount of data can be obtained in three operation cycles, except for the initial calculation. Thus, the vector processor shown in FIG. 5 doubles the calculation performance compared with that of the prior art vector processor, when many terms of the recurrent equations are to be calculated.

Another embodiment of the vector processor in accordance with the present invention will be described with reference to FIG. 7.

Figure 7:
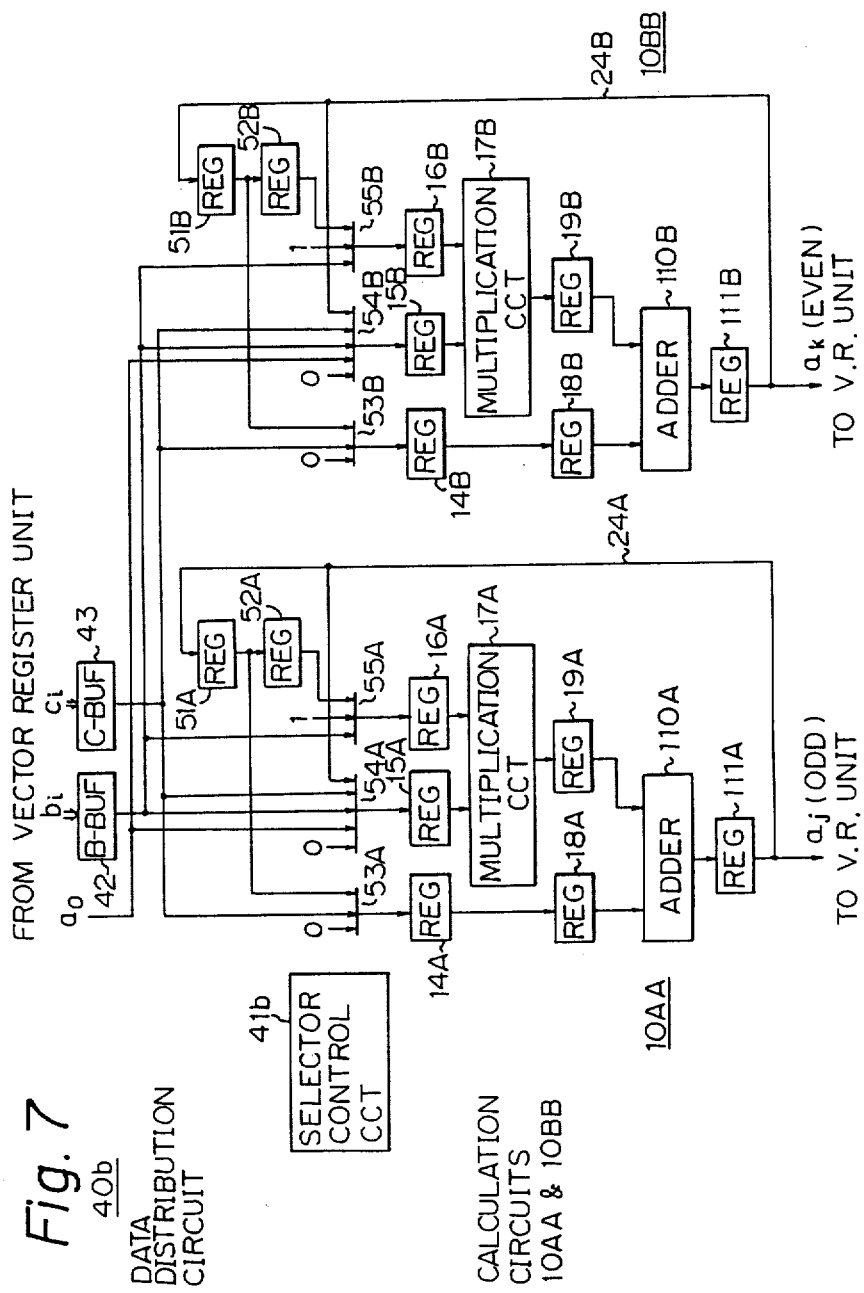
FIG. 7 is a circuit diagram of another embodiment of a vector processor in accordance with the present invention; and, FIG. 8 is an operation timing chart of the vector processor shown in FIG. 7.

In FIG. 7, the vector processor includes a data distribution circuit 40b and a vector data calculation unit consisting of an odd term calculation circuit 10AA and an even term calculation circuit 10BB.

The data distribution circuit 40b is provided in the vector register unit shown in FIG. 2, the odd term calculation circuit 10AA, and the even term calculation circuit 10BB, to supply an initial operand $a_0$ and operands (input data) $b_i$ and $c_i$ to the odd and even term calculation circuits 10AA and 10BB in a predetermined manner, as described later. The data distribution circuit 40b also receives a pair of odd term data $a_j$ calculated at the odd term calculation circuit 10AA and even term data $a_k$ calculated at the even term calculation circuit 10BB, and outputs the same to the vector register unit.

The data distribution circuit 40b includes a selector control circuit 41b, the B-BUFF 42, the C-BUFF 43, buffer registers 51A and 52A, selectors 53A, 54A, and 55A, registers 51B and 52B, and selectors 53B, 54B and 55B. The data distribution circuit 40b also includes the zero setter and the one setter (not shown).

The odd term calculation circuit 10AA includes the first-stage registers 14A, 15A, and 16A, the multiplication circuit 17A, the second-stage registers 18A and 19A, the adder 110A, the third-stage register 111A, and a feedback line 24A connected between an output terminal of the register 111A and an input terminal of the register 51A.

The even term calculation circuit 10BB has the same circuit construction as that of the odd term calculation circuit 10AA.

The vector processor shown in FIG. 7 calculates the recurrent equation defined by the formula (2). The odd term calculation circuit 10AA and the data distribution circuit 40b cooperate to calculate the recurrent equations defined by the formula (4), and the even term calculation circuit 10BB and the data distribution circuit 40b also cooperate to calculate the recurrent equations defined by the formula (3).

The operation of the vector processor shown in FIG. 7 will be specifically described with reference to FIG. 8, when the instruction set shown in TABLE 1 is given.

The operation of the MSU 1, the MSCU 2, the VICU 51, and the VSAU 52, shown in FIG. 2, is omitted, since the operation thereof is substantially the same as that described above.

Figure 8:
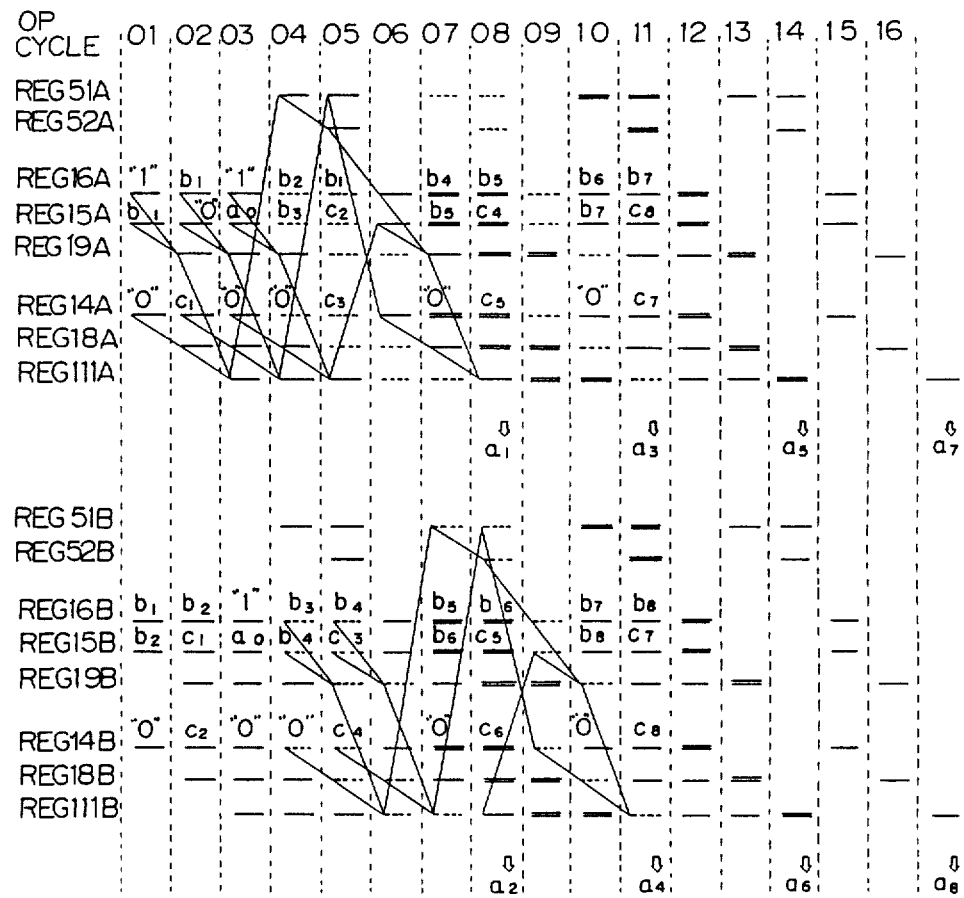

In FIG. 8, the operation cycles consist of initial operation cycles 01–08, and normal operation cycles 04–11, 10–14, etc.

OPERATION CYCLE 01–08

The following TABLE 8 and TABLE 9 show data in the registers 14A, 15A, 16A, and 111A, and data in the registers 14B, 15B, 16B, and 111B, during the initial operation cycles.

TABLE 8

| OP CYCLE | REG 14A | REG 15A | REG 16A | REG 111A |
|---|---|---|---|---|
| 01 | 0 | $b_1$ | 1 | |
| 02 | $c_1$ | 0 | $b_1$ | |
| 03 | 0 | $a_0$ | 1 | |
| 04 | | | | |
| 05 | | | | |
| 06 | $b_1 \times 0 + c_1$ | $1 \times a_0 + 0$ | $1 \times b_1 + 0$ | |
| 07 | | | | |
| 08 | | | | $a_1$ |

TABLE 9

| OP CYCLE | REG 14B | REG 15B | REG 16B | REG 111B |
|---|---|---|---|---|
| 01 | 0 | $b_2$ | $b_1$ | |
| 02 | $c_2$ | $c_1$ | $b_2$ | |
| 03 | 0 | $a_0$ | 1 | |
| 04 | | | | |
| 05 | | | | |
| 06 | $c_1 \times b_2 + c_2$ | $1 \times a_0 + 0$ | $b_1 \times b_2 + 0$ | |
| 07 | | | | |
| 08 | | | | $a_2$ |

The selector control circuit 41b controls the selectors 53A, 54A, and 55A to load data into the registers 14A, 15A, and 16A, as shown in TABLE 8, and the selector control circuit 41b controls the selectors 53B, 54B, and 55B to load data into the registers 14B, 15B, and 16B, as shown in TABLE 9.

First, a calculation of the term $a_j$ in the odd term calculation circuit 10AA will be described.

OPERATION CYCLE 01

Data 0, $b_1$, and 1 are loaded into the registers 14A, 15B, and 16A, and a calculation of $(b_1 \times 1)$ is carried out at the multiplication circuit 17A.

OPERATION CYCLE 02

Data 0 and $(b_1 \times 1)$ are loaded into the registers 18A and 19A, and both data are added at the adder 110A, to obtain the result $(b_1 \times 1 + 0)$. At the same time, data $c_1$, $b_1$ and 0 are loaded into the registers 14A, 15A, and 16A, and a calculation of $(b_1 \times 0)$ is carried out at the multiplication circuit 17A.

OPERATION CYCLE 03

The data $(b_1 \times 1 + 0)$ is stored in the register 111A.

The data $c_1$ stored in the register 18A and the data $(b_1 \times 0)$ stored in the register 19A are added at the adder 110A, to obtain the result $(b_1 \times 0 + c_1)$. At the same time, data 0, $a_0$, and 1 are loaded into the registers 14A, 15A, and 16A, and a calculation of $(a_0 \times 1)$ is carried out at the multiplication circuit 17A.

OPERATION CYCLE 04

The data $(b_1 \times 1 + 0)$ stored in the register 111A is transferred to the register 51A. The data 0 stored in the register 18A and the data $(a_0 \times 1)$ stored in the register 19A are added at the adder 111A, to obtain the result $(a_0 \times 1 + 0)$.

OPERATION CYCLE 05

The data $(b_1 \times 1 + c_1)$ and $(b_1 \times 0 + c_1)$ are sequentially loaded into the registers 51A and 52A, respectively. The data $(a_0 \times 1 + 0)$ is stored in the register 111A.

OPERATION CYCLE 06

The data $(a_0 \times 1 + 0)$ stored in the register 111A is transferred to the register 15A, and the data $(b_1 \times 1 + 0)$ stored in the register 52A is transferred to the register 16A. As a result, the data $(a_0 \times 1 + 0) \times (1 \times b_1 + 0)$ is obtained at the multiplication circuit 17A.

The data $(b_1 \times 0 + c_1)$ stored in the register 51 is loaded into the register 14A.

OPERATION CYCLE 07

The data $(b_1 \times 0 + c_1)$ from the register 14A is loaded into the register 18A.

The data $(b_1 \times 0 + c_1)$ stored in the register 18A and the data $(a_0 \times 1 + 0) \times (1 \times b_1 + 0)$ stored in the register 19A are added at the adder 110A, to obtain the resulting data $$(a_0 \times 1 + 0) \times (1 \times b_1 + 0) + (b_1 \times 0 + c_1)$$
$$= a_0 \times b_1 + c_1$$
$$= a_1$$

OPERATION CYCLE 08

The calculated data $a_1$ is stored in the register 111A and transferred to the vector register VR00.

Next, a calculation of the term $a_2$ in the even term calculation circuit 10BB will be described with reference to TABLE 9.

OPERATION CYCLE 01

Data 0, $b_2$, and $b_1$ are loaded into the registers 14B, 15B, and 16B, and a calculation of $(b_1 \times b_2)$ is carried out at the multiplication circuit 17B.

OPERATION CYCLE 02

Data 0, and $(b_1 \times b_2)$ are loaded into the registers 18B and 19B, and both data are added at the adder 110B, to obtain the result $(b_1 \times b_2 + 0)$. At the same time, data $c_2$, $c_1$, and $b_2$ are loaded into the registers 14B, 15B, and 16B, and a calculation of $(c_1 \times b_1)$ is carried out at the multiplication circuit 17B.

OPERATION CYCLE 03

The data $(b_1 \times b_2 + 0)$ is stored in the register 111B. The data $c_2$ stored in the register 18B and the data $(c_1 \times b_2)$ stored in the register 19B are added at the adder 110B, to obtain the result $(c_1 \times b_2 + c_2)$. At the same time, data 0, $a_1$, and 1 are loaded into the registers 14B, 15B, and 16B, and a calculation of $(a_0 \times 1)$ is carried out at the multiplication circuit 17B.

OPERATION CYCLE 04

The data $(b_1 \times b_2 + 0)$ stored in the register 111B is transferred to the register 51B. The data $(c_1 \times b_2 + c_2)$ is stored in the register 111B. The data 0 stored in the register 18B and the data $(a_0 \times 1 + 0)$ stored in the register 19B are added at the adder 110B to obtain the result $(a_0 \times 1 + 0)$.

OPERATION CYCLE 05

The data $(c_1 \times b_2 + c_2)$ and $(b_1 \times b_2 + 0)$ are loaded into the registers 51B and 52B, respectively. The data $(a_0 \times 1 + 0)$ is stored in the register 111B.

OPERATION CYCLE 06

The data $(c_1 \times b_2 + c_2)$ is loaded into the register 14B.

The data stored in the register 111B is transferred to the register 15B, and the data $(b_1 \times b_2 + 0)$ stored in the register 52B is transferred to the register 16B. As a result, data $(a_0 \times 1 + 0) \times (b_1 \times b_2 + 0)$ is obtained at the multiplication circuit 17B.

OPERATION CYCLE 07

The data $(c_1 \times b_2 + c_2)$ stored in the register 18B and the data $(a_0 \times 1 + 0) \times (b_1 \times b_2 + 0)$ are added at the adder 110B, to obtain the resulting data.

$$(a_0 \times 1 + 0) \times (b_1 \times b_2 + 0) + (c_1 \times b_2 + c_2)$$
$$= a_0 \times b_1 \times b_2 + b_2 \times c_1 + c_2$$
$$= a_2$$

OPERATION CYCLE 08

The calculated data $a_2$ is stored in the register 111B and transferred to the vector register VR00 together with the data $a_1$.

The initial calculation is terminated.

Now, the normal calculation will be briefly described. The normal calculation is similar to the initial calculation, except for the data loading and transferring. Thus, the following description is mainly of the data loading.

OPERATION CYCLE 04-11

During these cycles, the odd term $a_3$ and the even term $a_4$ are calculated.

The following TABLE 10 and TABLE 11 show data in the registers 14A, 15B, 16A and 111A, and data in the registers 14B, 15B, and 16B, and 111B.

TABLE 10

| OP CYCLE | REG 14A | REG 15A | REG 16A | REG 111A |
|---|---|---|---|---|
| 04 | 0 | $b_3$ | $b_2$ | |
| 05 | $c_3$ | $c_2$ | $b_3$ | |
| 06 | | | | |
| 07 | | | | |
| 08 | | | | |
| 09 | $b_3 \times c_2 + c_3$ | $a_1$ | $b_2 \times b_3 + 0$ | |
| 10 | | | | |
| 11 | | | | $a_3$ |

TABLE 11

| OP CYCLE | REG 14B | REG 15B | REG 16B | REG 111B |
|---|---|---|---|---|
| 04 | 0 | $b_4$ | $b_3$ | |
| 05 | $c_4$ | $c_3$ | $b_4$ | |
| 06 | | | | |
| 07 | | | | |
| 08 | | | | |
| 09 | $b_4 \times c_3 + c_4$ | $a_2$ | $b_3 \times b_4 + 0$ | |
| 10 | | | | |
| 11 | | | | $a_4$ |

OPERATION CYCLES 07-14

During these operation cycles, the odd term $a_5$ and the even term $a_6$ are calculated.

The following TABLE 12 and TABLE 13 show data in the registers 14A, 15A, 16A, and 111A, and data in the registers 14b, 15b, 16b, and 111B.

TABLE 12

| OP CYCLE | REG 14A | REG 15A | REG 16A | REG 111A |
|---|---|---|---|---|
| 07 | 0 | $b_5$ | $b_4$ | |
| 08 | $c_5$ | $c_4$ | $b_5$ | |
| 09 | | | | |
| 10 | | | | |
| 11 | | | | |
| 12 | $b_5 \times c_4 + c_5$ | $a_3$ | $b_4 \times b_5 + 0$ | |
| 13 | | | | |
| 14 | | | | $a_5$ |

TABLE 13

| OP CYCLE | REG 14B | REG 15B | REG 16B | REG 111B |
|---|---|---|---|---|
| 07 | 0 | $b_6$ | $b_5$ | |
| 08 | $c_6$ | $c_5$ | $b_6$ | |
| 09 | | | | |
| 10 | | | | |
| 11 | | | | |
| 12 | $b_6 \times b_5 + c_6$ | $a_4$ | $b_5 \times b_6 + 0$ | |
| 13 | | | | |
| 14 | | | | $a_6$ |

Other pluralities of pairs of odd and even terms can be calculated in the same way as described above.

The present invention is not limited by the above embodiments. For example, in the above embodiments, first-order developed recurrent equations as expressed by the formulas (2) to (4) were described. When the recurrent equation as expressed by the formula (1) is modified by using a second-order development, the following formula is obtained.

$$\begin{aligned} a_i &= a_{i-1} \times b_i + c_i \\ &= a_{i-2} \times b_{i-1} \times b_i + b_i \times c_{i-1} + c_i \\ &= a_{i-3} \times b_{i-2} \times b_{i-1} \times b_i + b_{i-2} \times b_{i-1} \times c_{i-2} + \\ &\quad b_i \times c_{i-1} + c_i \end{aligned} \quad (5)$$

Apparently, the above formula shows that there is no direct recurrent relationship between the terms $a_i$ and $a_{i-3}$.

When an index i is odd, for example, an odd index j is 3 and 5, the above formula is expressed as follows:

$$j = 3: \quad a_3 = a_0 \times b_1 \times b_2 \times b_3 + b_1 \times b_2 \times c_1 + b_3 \times c_2 + c_3 \quad (6)$$

$$j = 5: \quad a_5 = a_2 \times b_3 \times b_4 \times b_5 + b_3 \times b_4 \times c_3 + b_5 \times c_4 + c_5 \quad (7)$$

When an index i is even, for example, an even index k is 4 and 6, the above formula is expressed as follows:

$$k = 4: \quad a_4 = a_1 \times b_2 \times b_3 \times b_4 + b_2 \times b_3 \times c_2 + b_4 \times c_3 + c_4 \quad (8)$$

$$k = 6: \quad a_6 = a_3 \times b_4 \times b_5 \times b_1 + b_4 \times b_5 \times c_4 + b_6 \times c_5 + c_6 \quad (9)$$

From the above formulas (6) to (9), two odd terms $a_3$ and $a_5$, and two even terms $a_4$ and $a_6$ can be simultaneously calculated at a same timing. Thus, the operation time is further shortened. In this embodiment, an odd term calculation circuit is formed to calculate two adjacent odd terms, for example, $a_3$ and $a_5$, at a same timing. Similarly, an even term calculation circuit is formed to calculate two adjacent even terms at a same timing. A data distribution circuit is formed to distribute data to the odd and even term calculation circuits so that the above formulas can be calculated.

The vector processor of the present invention can be applied to a variety of data processing systems.

What we claim is:

1. A vector processor for processing a modified recurrent equation having a formula expressed, when first order developed, as $a_i = a_{i-2} \times b_{i-1} \times b_i + b_i \times c_{i-1} + c_i$, comprising:

vector instruction control means for controlling vector instructions;

main storage means for storing data;

vector storage access means for accessing input vector data and calculated data to said main storage means;

vector calculation means for calculating vector data under control of said vector instruction means, said vector calculation means includes at least one odd term calculation means for calculating odd terms of the modified recurrent equation according to the formulas $$a_1 = a_0 \times b_1 + c_1$$

$$a_j = a_{j-2} \times b_{j-1} \times b_j + b_j \times c_{j-1} + c_j$$

where j is an odd integer, each odd term calculation means including a first adding circuit, a first multiplication circuit, at least one odd term data storage circuit for holding a calculated odd term, and at least one odd term feedback line for feeding back the calculated odd term to at least one of said multiplication circuit and said first adding circuit through said odd term data storage circuit; and at least one even term calculation circuit means for calculating even terms of the modified recurrent equation according to the formula $$a_k = a_{k-2} \times b_{k-1} \times b_k + b_k \times c_{k-1} + c_k$$

where k is an even integer, each even term calculation means including a second adding circuit, a second multiplication circuit, at least one even term data storage circuit for holding a calculated even term, and at least one even term feedback line for feeding back the calculated even term to at least one of said second multiplication circuit and said second adding circuit through said even term data storage circuit; and data distribution means, operatively connected to and cooperative with said vector calculation means to process the modified recurrent equation, said data distribution means including a first data setter for outputting zero;

a second data setter for outputting one;

a plurality of selectors for selecting input operands for calculating the recurrent equation, constant data 0 and 1 from said first and second data setters, and the calculated odd and even terms; and a selector control unit for controlling said plurality of selectors in a predetermined manner defined by the modified recurrent equation, to supply selected data to said odd and even term calculation means.

2. A vector processor according to claim 1, wherein said odd and even term calculation circuits are independently and simultaneously operable to calculate at least one pair of adjacent odd and even terms of the current equation, at a same operation time.

3. A vector processor according to claim 2, wherein said data distribution means further comprises:
 a first first-in/first-out type buffer for inputting and outputting a plurality of first operands as source multipliers or multiplicands; and
 a second first-in/first-out type buffer for inputting and outputting a plurality of second operands as source addends.

4. A vector processor according to claim 3,
wherein said at least one odd term feedback line of said odd term calculation means comprises first, second and third odd term feedback lines;
wherein said odd term calculation means is formed so that
 (a) said first adding circuit receives an addend from a first selection of said plurality of selectors,
 (b) said first multiplications circuit receives a multiplier and a multiplicand from second and third selectors of said plurality of selectors,
 (c) said first adding circuit for receiving multiplied data from said first multiplication circuit,
 (d) said odd term data storage circuit receives addition data from said first adding circuit,
 (e) said first selector receives the constant data of zero, the second operand from said second buffer, and the addition data stored in said odd term data storage circuit through said second feedback line,
 (f) said second selector receives the constant data of one, the first operand, and the addition data through said third feedback line, and
 (g) said third selector receives the constant data of one, an initial data term, the first and second operands from said first and second buffers, and the multiplied data from said first multiplication circuit through said first feedback line;
wherein said at least one even term feedback line of said even term calculation means comprises fourth, fifth and sixth feedback lines; and
wherein said even term calculation means is formed so that
 (h) said second adding circuit receives an addend from a fourth selector of said plurality of selectors,
 (i) said second multiplication circuit receives a multiplier and a multiplicand from fifth and sixth selectors of said plurality of selectors,
 (j) said second adding circuit for receiving multiplied data from said second multiplication circuit,
 (k) said even term data storage circuit receives addition data from said second adding circuit,
 (l) said fourth selector receives the constant data of zero, the second operand from said second buffer, and the addition data stored in said even term data storage circuit through said fifth feedback line,
 (m) said fifth selector receives the constant data of one, the first operand, and the addition data through said sixth feedback line, and
 (n) said sixth selector receives the constant data of one, the initial data, the first and second operands from said first and second buffers, and the multiplied data from said second multiplication circuit through said fourth feedback line.

5. A vector processor according to claim 4,
wherein said odd term calculation means comprises:
 an odd first-stage first data storage circuit connected to said first selector, for temporarily storing data therefrom;
 odd first-stage second and third data storage circuits respectively connected between said second and third selectors and said first multiplication circuit, for temporarily storing data from said second and third selectors;
 an odd second-stage first data storage circuit connected between said odd first-stage first data storage circuit and said first adding circuit, for temporarily storing data from said odd first-stage first data storage circuit;
 an odd second-stage second data storage circuit having an input terminal connected to said first multiplication circuit and an output terminal connected to said first adding circuit and said first feedback line, said second-stage second data storage circuit temporarily storing the multiplied data from said first multiplication circuit; and
 an odd third-stage data storage circuit connected between said first adding circuit and said odd term data storage circuit and to said third feedback line, for temporarily storing the addition data from said first adding circuit, and
wherein said even term calculation means comprises:
 even first-stage first data storage circuit connected to said fourth selector, for temporarily storing data therefrom;
 even first-stage second and third data storage circuits respectively connected between said fifth and sixth selectors and said second multiplication circuit, for temporarily storing data from said fifth and sixth selectors;
 even second-stage first data storage circuit connected between said even first-stage first data storage circuit and said second adding circuit, for temporarily storing data from said even first-stage first data storage circuit;
 even second-stage second data storage circuit having an input terminal connected to said second multiplication circuit and an output terminal connected to said second adding circuit and said fourth feedback line, said even second-stage second data storage circuit temporarily storing the multiplied data from said second multiplication circuit; and
 even third-stage data storage circuit connected between said second adding circuit and said even term data storage circuit and to said sixth feedback line, for temporarily storing the addition data from said second adding circuit.

6. A vector processor according to claim 5,
wherein, at an initial operation time,
 said odd term calculation means and said data distribution means cooperate to calculate the following terms $$a_1 = a_0 \times b_1 30 \, c_1$$

$$a_1 = a_1 \times 1 + 0$$

during two operation times; and
 said even term calculation means and said data distribution means cooperate to calculate the following terms $$a_1 = a_0 \times b_1 + c_1$$

$$a_2 = a_1 \times b_2 + c_2$$

during the same two operation times, and
wherein at a normal operation time after the initial operation time,
said odd term calculation means and said data distribution means cooperate to calculate each odd term of the following formula $$a_j = a_{j-2} \times b_{j-1} \times b_j + b_j \times c_{j-1} + c_j$$

where, $j = 3, 5, \ldots, n$
in each operation time; and
said even term calculation means and said data distribution means cooperate to calculate each even term of the following formula $$a_k = a_{k-2} \times b_{k-1} \times b_k + b_k \times c_{k-1} + c_k$$

where, $k = 4, 6, \ldots, n+1$
in each operation time.

7. A vector processor according to claim 6, wherein each operation time comprises a plurality of operation cycles of said vector processor, the operation times are identical for calculating each term, and adjacent operation times for calculating adjacent terms are partially overlapped.

8. A vector processor according to claim 7, wherein said data distribution means receives data from said odd and even third-stage data storage circuits and outputs the data to said vector storage access means.

9. A vector processor according to claim 8,
wherein said vector storage access means comprises a vector register unit for temporarily storing the input operands and the calculated odd and even terms, and
wherein said data distribution means transfers the input operands and the calculated odd and even terms.

10. A vector processor according to claim 2,
wherein said at least one odd term feedback line of said odd term calculation means comprises a first feedback line, and first and second odd term data storage circuits connected in series for storing the calculated odd terms supplied through said first feedback line,
wherein said odd term calculation means is formed so that
(a) said first adding circuit receives an addend from a first selector of said plurality of selectors,
(b) said first multiplication circuit receives a multiplier and a multiplicand from second and third selectors of said plurality of selectors,
(c) said first adding circuit for receiving multiplied data from said first multiplication circuit,
(d) said first odd term data storage circuit receives addition data from said first adding circuit,
(e) said second odd term data storage circuit receives the addition data from said first odd term data storage circuit,
(f) said first selector receives the constant data of zero, the second operand from said second buffer, and the addition data from said first odd term data storage circuit,
(g) said second selector receives the constant data of zero, an initial data, the first and second operands, and the addition data from said first adding circuit through said first feedback line, and
(h) said third selector receives the constant data of one, the first operand from said first buffer, and the addition data stored in said second odd term data storage circuit,
wherein said at least one even term feedback line of said even term calculation means comprises a second feedback line, and first and second even term data storage circuits connected in series and for storing the calculated even terms supplied through said second feedback line, and
wherein said even term calculation means is formed so that
(i) said second adding circuit receives an addend from a fourth selector of said plurality of selectors,
(j) said second multiplication circuit receives a multiplier and a multiplicand from fifth and sixth selectors of said plurality of selectors,
(k) said second adding circuit for receiving multiplied data from said second multiplication circuit,
(l) said first even term data storage circuit receives addition data from said second adding circuit,
(m) said second even term data storage circuit receives the addition data from said first even term data storage circuit,
(n) said fourth selector receives the constant data of zero, the second operand from said second buffer, and the addition data from said first even term data storage circuit,
(o) said fifth selector receives the constant data of zero, the initial data, the first and second operands, and the addition data from said second adding circuit through said second feedback line, and
(p) said sixth selector receives the constant data of one, the first operand from said first buffer, and the addition data stored in said second even term data storage circuit. 10, 11. A vector processor according to claim
wherein said odd term calculation means comprises:
an odd first-stage first data storage circuit connected to said first selector, for temporarily storing data therefrom;
odd first-stage second and third data storage circuits respectively connected between said second and third selectors and said first multiplication circuit, for temporarily storing data from said second and third selectors;
an odd second-stage first data storage circuit connected between said odd first-stage first data storage circuit and said first adding circuit, for temporarily storing data from said odd first-stage first data storage circuit;
an odd second-stage second data storage circuit having an input terminal connected to said first multiplication circuit and an output terminal connected to said first adding circuit, said odd second-stage second data storage circuit temporarily storing the multiplied data from said first multiplication circuit; and
an odd third-stage data storage circuit connected between said first adding circuit and said first odd term data storage circuit through said first feedback line, for temporarily storing the addition data from said first adding circuit, and
wherein said even term calculation means comprises:
even first-stage first data storage circuit connected to said fourth selector, for temporarily storing data therefrom;
even first-stage second and third data storage circuit respectively connected between said fifth and sixth selectors and said second multiplication circuit, for temporarily storing data from said fifth and sixth selectors;
even second-stage first data storage circuit connected between said even first-stage first data storage circuit and said second adding circuit, for temporarily storing data from said even first-stage first data storage circuit;
even second-stage second data storage circuit having an input terminal connected to said second multiplication circuit and an output terminal connected to said second adding circuit, and even second-stage second data storage circuit temporarily storing the multiplied data from said second multiplication circuit; and
even third-stage data storage circuit connected between said second adding circuit and said first even term data storage circuit through said second feedback line, for temporarily storing the addition data from said second adding circuit.

12. A vector processor according to claim 11, wherein, at an initial operation time,
said odd term calculation means and said data distribution means cooperate to calculate the following terms $$a_1 = a_0 \times b_1 30 \, c_1$$

$$a_1 = a_1 \times 1 + 0$$

during two operation times; and
said even term calculation means and distribution means cooperate to calculate the following terms $$a_1 = a_0 \times b_1 + c_1$$

$$a_2 = a_1 \times b_2 + c_2$$

during the same two operation times, and
wherein at a normal operation time after the initial operation time,
said odd term calculation means and said data distribution means cooperate to calculate each odd term of the following formula $$a_j = a_{j-2} \times b_{j-1} \times b_j + b_j \times c_{j-1} + c_j$$

where, $j = 3, 5, \ldots, n$
in each operation time; and
said even term calculation means and said data distribution means cooperate to calculate each even term of the following formula $$a_k = a_{k-2} \times b_{k-1} \times b_k + b_k \times c_{k-1} \times c_k$$

where, $k = 4, 6, \ldots, n+1$
in each operation time.

13. A vector processor according to claim 12, wherein each operation time comprises a plurality of operation cycles of said vector processor, the operation times are identical for calculation of each term, and adjacent operation times for calculating adjacent terms are partially overlapped.

14. A vector processor according to claim 13, wherein said data distribution means receives data from said odd and even third-stage data storage circuits and outputs to data to said vector storage access means.

15. A vector processor according to claim 14,
wherein said vector storage access means comprises a vector register unit temporarily storing the input operands and the calculated odd and even terms, and
wherein said data distribution means transfers the input operands and the calculated odd and even terms.

16. A vector processing system for processing a modified recurrent equation having odd and even terms, the modified recurrent equation has a formula of a form $$a_i = a_{i-2} \times b_{i-1} \times b_i + b_i \times c_{i-1} + c_i$$

where i is an integer, said vector processing system including a storage unit for storing vector data, said vector processing system comprising:
vector instruction control means for receiving vector instructions and for controlling processing of the vector instructions;
vector storage access means for accessing the vector data from the main storage unit and for transferring calculated vector data to the main storage unit;
vector calculation means, having an input end, for calculating the calculated vector data under control of said vector instruction control means, said vector calculation means includes
at least one term calculation means for calculating the odd terms of the modified recurrent equation; and
at least one even term calculation circuit means for calculating the even terms of the modified recurrent equation concurrently with the calculating of said at least one odd term calculation means; and
data distribution means for supplying the vector data from said vector storage access means to said vector calculation means, and for temporarily storing and supplying the odd terms and the even terms calculated by said vector calculation means to the input end of said vector calculation means.

17. A vector processing system for processing a modified recurrent equation having odd and even terms, the modified recurrent equation has a formula of a form $$a_i = a_{i-3} \times b_{i-2} \times b_{i-1} \times b_i 30$$
$$b_{i-2} \times b_{i-1} \times c_{i-2} + b_i \times c_{i-1} + c_i$$

where i is an integer, said vector processing system including a storage unit for storing vector data, said vector processing system comprising:
vector instruction control means for receiving vector instructions and for controlling processing of the vector instructions;
vector storage access means for accessing the vector data from the main storage unit and for transferring calculated vector data to the main storage unit;
vector calculation means, having an input end, for calculating the calculated vector data under control of said vector instruction control means, said vector calculation means includes at least one odd term calculation means for calculating the odd terms of the modified recurrent equation; and at least one even term calculation circuit means for calculating the even terms of the modified recurrent equation concurrently with the calculating of said at least one odd term calculation means; and data distribution means for supplying the vector data from said vector storage access means to said vector calculation means, and for temporarily storing and supplying the odd terms and the even terms calculated by said vector calculation means to the input end of said vector calculation means.

* * * * *

UNITED STATES PATENT AND TRADEMARK OFFICE
CERTIFICATE OF CORRECTION

PATENT NO. : 4,949,292
DATED : August 14, 1990
INVENTOR(S) : Hoshino et al.

It is certified that error appears in the above-identified patent and that said Letters Patent is hereby corrected as shown below:

Col. 15, line 50, "$b_3.$" should be --$b_3$--;

Col. 16, line 15, "$b_{1-1}$" should be --$b_{i-1}$--;

Col. 20, line 43, after "claim" insert --10--;

Col. 22, line 53, "30" should be --+--.

Signed and Sealed this

Third Day of March, 1992

Attest:

HARRY F. MANBECK, JR.

Attesting Officer     Commissioner of Patents and Trademarks